(12) United States Patent
Khanna et al.

(10) Patent No.: US 6,999,995 B2
(45) Date of Patent: *Feb. 14, 2006

(54) CONSOLE REDIRECTION SYSTEM FOR REMOTELY CONTROLLING OPERATION OF DEVICES ON A HOST COMPUTER IF DATA PACKET HAS BEEN RECEIVED DURING A TIME INTERVAL

(75) Inventors: Rahul Khanna, Beaverton, OR (US); Mahesh S. Natu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 10/405,857

(22) Filed: Apr. 1, 2003

(65) Prior Publication Data
US 2003/0200273 A1     Oct. 23, 2003

Related U.S. Application Data

(63) Continuation of application No. 09/387,614, filed on Aug. 31, 1999, now Pat. No. 6,609,151.

(51) Int. Cl.
*G06F 15/16* (2006.01)

(52) U.S. Cl. .................. 709/208; 709/222; 709/227

(58) Field of Classification Search ............... 709/222, 709/220, 208, 227, 202; 713/1, 154, 2; 370/355; 710/48, 260, 52
See application file for complete search history.

(56) References Cited

U.S. PATENT DOCUMENTS

| | | | |
|---|---|---|---|
| 5,142,680 A | 8/1992 | Ottman et al. | |
| 5,319,754 A * | 6/1994 | Meinecke et al. | 710/52 |
| 5,452,454 A | 9/1995 | Basu | |
| 5,515,538 A * | 5/1996 | Kleiman | 710/260 |
| 5,680,547 A | 10/1997 | Chang | |
| 5,732,268 A | 3/1998 | Bizzarri | |
| 5,815,733 A * | 9/1998 | Anderson et al. | 710/48 |
| 5,912,888 A * | 6/1999 | Walsh et al. | 370/355 |
| 5,978,912 A | 11/1999 | Rakavy et al. | |
| 6,292,181 B1 | 9/2001 | Banerjee et al. | |
| 6,317,826 B1 | 11/2001 | McCall et al. | |
| 6,401,202 B1 * | 6/2002 | Abgrall | 713/2 |
| 6,609,151 B1 * | 8/2003 | Khanna et al. | 709/222 |

* cited by examiner

*Primary Examiner*—Le Hien Luu
(74) *Attorney, Agent, or Firm*—Fish & Richardson P.C.

(57) ABSTRACT

A technique for providing communication between two computers through a network in a way to allow one computer to control the other.

20 Claims, 3 Drawing Sheets

CONSOLE REDIRECTION SYSTEM FOR REMOTELY CONTROLLING OPERATION OF DEVICES ON A HOST COMPUTER IF DATA PACKET HAS BEEN RECEIVED DURING A TIME INTERVAL

This application is a continuation (and claims the benefit of priority under 35 USC 120) of U.S. application Ser. No. 09/387,614, filed Aug. 31, 1999 now U.S. Pat. No. 6,609,151. The disclosure of the prior application is considered part of (and is incorporated by reference in) the disclosure of this application.

BACKGROUND

This disclosure generally relates to communication among linked computers, and more specifically, to access and control of one computer by a remote computer.

Computers, their peripherals, and other information processing devices can be connected to one another by communication channels to form computer networks. The communication channels may be wired links such as electrical cables and optic fibers, or wireless links by radio waves, or a combination of both. Linked computers can communicate with one another to exchange data and share various hardware and software resources over the network.

A computer connects to a network by using a network interface card ("NIC"). Other information processing devices may also use a NIC to communicate with a network. The NIC essentially operates as an agent to provide communication between the computer and the network. Each NIC can have a hardwired identification number known as medium access control ("MAC") address so that an associated computer can be uniquely identified by other computers in the network.

Computers in a network, e.g., a local network ("LAN"), may have different properties from one another, such as hardware configurations, NIC specifications, and operating systems. Communication protocols can encode the data in a way that different computers can "understand" one another regardless their differences. In addition, different networks within a wide area network ("WAN") may use different protocols. Hence, additional protocols may be used to allow communication between different networks. For example, the Internet uses TCP/IP protocols as its WAN communication protocols and a computer is assigned with an Internet protocol (IP) address in order to be uniquely identified and recognized over the Internet.

One trend in network computing is to increase the accessibility, manageability, and control of hardware, software, or data in the network by a user from a different location where a link to the network is available. For example, a networked computer may implement instrumentation to allow remote access of its internal system contents (e.g., hardware and software components, static and dynamic data in its memory units) from an authorized computer via the network. As another example, a computer may be booted by first downloading system software from a remote server across a network and then executing the boot routine. This preboot operation can be implemented by using the Preboot Execution Environment (PXE) technology (Wired For Management 2.0, Intel, 1998).

SUMMARY

The present specification provides a technique for exchanging data between two networked computers to allow one computer to control the other and to share the hardware and software resources. One embodiment of the technique uses a basic input and output system (BIOS) of a first computer to control a network interface card (NIC) to communicate with a second computer in a network. A timer interrupt is generated based on a timing signal in the first computer. The BIOS of the first computer is configured to communicate with the second computer according to the timer interrupt to allow the second computer to control the first computer both when the first computer has a running operating system, and when the first computer does not have a running operating system.

DETAILED DESCRIPTION

Figure 1:
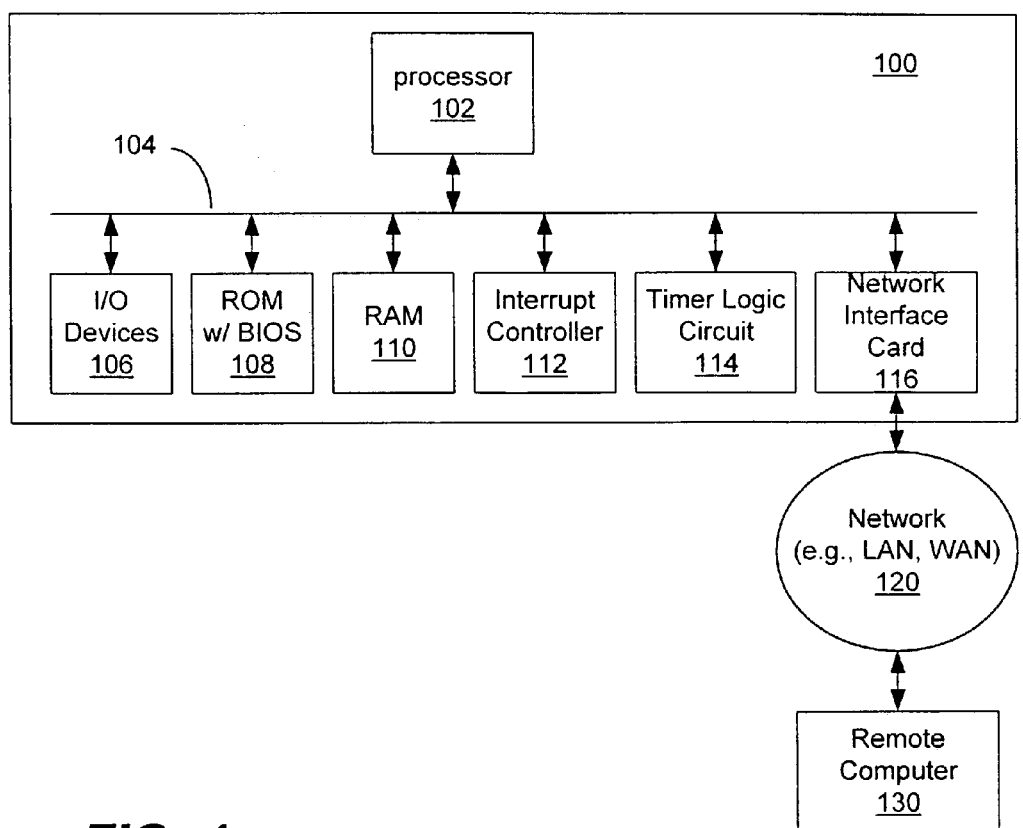
FIG. 1 shows one embodiment of a computer that implements a console redirection to a remote computer.

FIG. 1 shows one computer 100 that is connected to a network 120 to communicate with a remote computer 130. The techniques disclosed herein are operable to configure and control the computer 100 so that operations of the computer 100 can be controlled from another remote computer (e.g., the computer 130) as if the user were physically present. This allows sharing of hardware and software resources between the computers 100 and 130. The above operation appears to "redirect" the control console of the computer 100 to a remote computer 130. The remote computer 130 may be at any location that has a link to the network 120 and may be a portable computer, a desktop PC, a workstation, or any other information processing device based on a computer processor. This console redirection improves the efficiency and reduces costs in resource sharing, service, and management of networked computers.

In one embodiment, the computer 100 includes a processor 102 (e.g., an Intel microprocessor), a system bus 104, and a NIC 116 connected to the system bus 104. The system bus 104 also connects other computer devices within the computer 100, among which only I/O devices 106 (e.g., keyboard and monitor), a read-only memory ("ROM") 108, a random-access memory ("RAM") 110, an interrupt controller 112, and a timer logic circuit 114 are shown as examples. A basic input and output system ("BIOS"), i.e., a set of operating routines or instructions that control data communication between different devices within a computer, is stored in the ROM 108. When the computer 100 is turned on, the BIOS instructions are executed by the computer processor 102 to initialize and establish communication of the devices connected to the system bus 104 (including the NIC 116). Then, an operating system is launched to control the operations of the computer 100. The operating system may be installed locally within the computer 100 or in a remote device connected to the network 120.

At least a portion of the RAM 110 is allocated to buffer data received through the NIC 116 from the network 120 and data generated by other devices in the computer 100 that is to be sent to the network 120. A data packet from the network 120 is first stored in the RAM 110 and then the BIOS unpacketizes the data and sends it to a respective device. Similarly, the outgoing data is first captured and stored in the RAM 110 and is then transmitted to the network 120 in a packet form based on a protocol used by the BIOS.

The NIC 116 may include a network controller, NIC memory units, a system interface to the computer system bus 104, and a communication port that connects to the network 120 through at least one communication channel. The network controller is a logic circuit that controls the NIC operations including communication between the NIC 116 and the BIOS of the computer through the system interface and communication between the NIC 116 and the network 120 through the communication port. The NIC memory units may include a RAM and a ROM. The RAM may function as a memory buffer to temporarily store data that either is sent to or received from the network 120. The ROM, which may be implemented by an electronically erasable programmable ROM ("EEPROM"), may store NIC application programs such as communication programs to control the network controller and the NIC operations. Although only one NIC 116 is shown, the computer 100 may include two or more NICs.

The network 120 uses a given set of communication protocols to control and organize the communication among different computers. A part of the BIOS in the ROM 108 of the computer 100 implements these protocols to translate or interpret data generated by the computer 100 in a way that is independent of its computer hardware and software configurations. Hence, the computer 100 and other computers "speak" the same language at the network level, i.e., they use a common data format for data packets that are exchanged through the network 120.

Another function of the protocols is network addressing. When the computer 100 is connected to the network 120 through its NIC 116, a router, i.e., a computer connected in the network 120 to control the network communication, assigns a network address to the computer 100 (e.g., the IP address in the TCP/IP). The data sent out by the computer 100 is packaged with the assigned network address and other information in the packet header according to the given protocols. Hence, any computer in the network 120 (e.g., the remote computer 130) can recognize that the data is from the computer 100. Conversely, another computer, when sending data specifically to the computer 100, also adds the network address of the computer 100 to its data packet header so the network 120 can properly route the data to the computer 100.

The computer 100 is controlled so that the remote computer 130 can access and execute its BIOS in the ROM 108 through the NIC 116 and the network 120 regardless of the operating status of the computer 100. This access can include, e.g., before or after the computer 100 is booted, when it experiences a failure, or it is under a power management mode such as hibernation. In particular, the present console redirection allows communication between the computer 100 and the remote computer 130 when the computer 100 does not have a locally-running operating system ("OS"), e.g., before the OS is launched, when the computer 100 has failed to boot for some reason or does not have an OS installed locally. Hence, the console redirection may be implemented by operations of software and hardware components at the BIOS level of the computer 100 in order to perform certain operations in absence of a local OS and to operate by running an OS in the remote computer 130.

This OS-independent console redirection may be implemented from at least two different aspects. First, the BIOS stored in the ROM 108 includes special routines and instructions that control and coordinate the console redirection from the computer 100 to the remote computer 130. These special BIOS routines and instructions control operations of the NIC 116 and direct data for the console redirection to a desired destination. For example, the incoming data from the NIC 116 may be directed by the BIOS to respective devices in the computer 100 for further processing or executing certain actions such as the processor 102, the I/O devices 106, etc. In addition, these special BIOS routines and instructions packetize data generated by the computer 100 and send the data packets to the NIC 116 for transmission to the network 120 based on the communication protocols.

In another aspect, an NIC hardware layer interface may be implemented to make the communication between the computer 100 and the network 120 (to the remote computer 130) independent of the specific hardware configuration of the NIC 116. This is desirable because the different NICs may have different hardware configurations due to different standards used by different NIC manufacturers and therefore communication with different NICs is in general configuration-specific, specially during the communication between the computer 100 and the network 130 prior to boot of the computer 100. This NIC interface simplifies the console redirection by minimizing or removing the dependence on the NIC configuration. It can make different NICs communicate to the network 120 in a uniform manner. Both hardware and software implementations or a combination of both may be used.

In a software implementation, the NIC interface is an application programming interface ("API") having a set of NIC routines. These NIC routines include initialization routines to obtain information on the hardware configuration of the NIC 116, including its MAC address and data structure, and then convert the obtained NIC information into a format based on a standard protocol. The converted NIC information is transferred to the RAM 110 to be used by the BIOS in the ROM 108 for communicating with the network 120. The NIC routines also establish a communication link between the NIC 116 and the network 120 for receiving or transmitting data based on the standard protocol under control of the BIOS.

At least two different types of interrupt service routines ("ISRs") are involved in the present console redirection. The first type of interrupts is a timer interrupt service routine. The interrupt controller 112 periodically generates this timer ISR at periodic timer ticks of a clock signal produced by the timer logic circuit 114. The BIOS in the ROM 108 can execute an operation for the console redirection only at a timer ISR. Hence, the frequency of this clock signal partially determines the speed at which the data is sent or received through the NIC 116 by the computer 100. In operation, if there is received data from the network 120 or data to be sent out to the network 120, the BIOS directs the received data to a respective device within the computer 100 or sends the data to the NIC 116 for transmission to the network 120 at a timer tick. For example, the interrupt controller 112 can indicate a timer interrupt to the processor 102 which looks at a timer interrupt address to execute a program. When there is no new data received or to be sent at a timer tick, the BIOS exits the timer ISR and performs other tasks.

A second type of interrupt is an asynchronous interrupt generated by the interrupt controller 112 whenever the NIC 116 receives a data packet from the network 120. The NIC 116 sends the received data packet to the RAM 110 and the interrupt controller 112 directs the BIOS to process the received data as a timer ISR. Such interrupts are asynchronous because data packets from the network 120 arrive at unexpected times depending on the network conditions such as communication traffic.

The BIOS of the computer 100 may control the timer logic circuit 114 to adjust the frequency of the clock signal from which the timer interrupt is generated according to the data flow rate between the computer 100 and the network 120. This mechanism allows the computer 100 to handle the communication with the remote computer 130 more efficiently, by dynamically allocating sufficient amount of computing power of the computer 100 to the communication with the network 120. Ideally, the frequency of the clock signal matches the data flow rate between the computer 100 and the network 120. At each and every timer tick, a timer interrupt command the BIOS to either send or receive a data packet, and little or no data is buffered in the RAM 110. In an actual implementation, the frequency of the clock signal should match the data flow rate as close as possible.

A set of BIOS routines may be implemented to increase the frequency of the clock signal as the data flow rate increases and to reduce the frequency of the clock signal as the data flow rate decreases. One or more monitoring routines may be included in the BIOS to monitor the flow rate. For example, the BIOS may include routines to monitor the flow rate of data into the allocated area in the RAM 110 for buffering the communication data, or count the rate of asynchronous interrupts generated by the NIC 116. The information on the flow rate is then used to adjust the frequency of the timer ticks.

In general, any data that is available to the BIOS can be made accessible for the remote computer 130, including data packets for the display from the video memory on the status of the system or a device, security information, I/O information, and handshaking information of the computer 100. The remote computer 130 can remotely control the computer 100 by sending data and commands via the network 120 and the BIOS of the computer 100 would process these data and commands as if they were generated locally. The data and commands may include the keyboard data (e.g., a keystroke or a combination of keystrokes), data from a pointing device (e.g., the mouse), and instructions generated by one or more application programs running on the remote computer 130. In this context, the console of the computer 100 is redirected to the remote computer 130. In addition, this console redirection allows an operation in the computer 100 to use hardware or software resources residing in the remote computer 130 or vice versa.

The above console redirection is achieved at least in part by configuring and operating the NIC 116 to send desired data from the BIOS of the computer 100 to the remote computer 130 and to receive data from the remote computer 130, all through operations of the BIOS of the computer 100. The BIOS of the computer 100 has routines for capturing and packetizing the data in the computer 100 with headings according to communication protocols so that the data can be routed to the remote computer 130 through the network 120. In addition, the BIOS has routines for unpacketizing received data packets by the NIC 116 and directing the data to respective devices in the computer 100.

Figure 2:
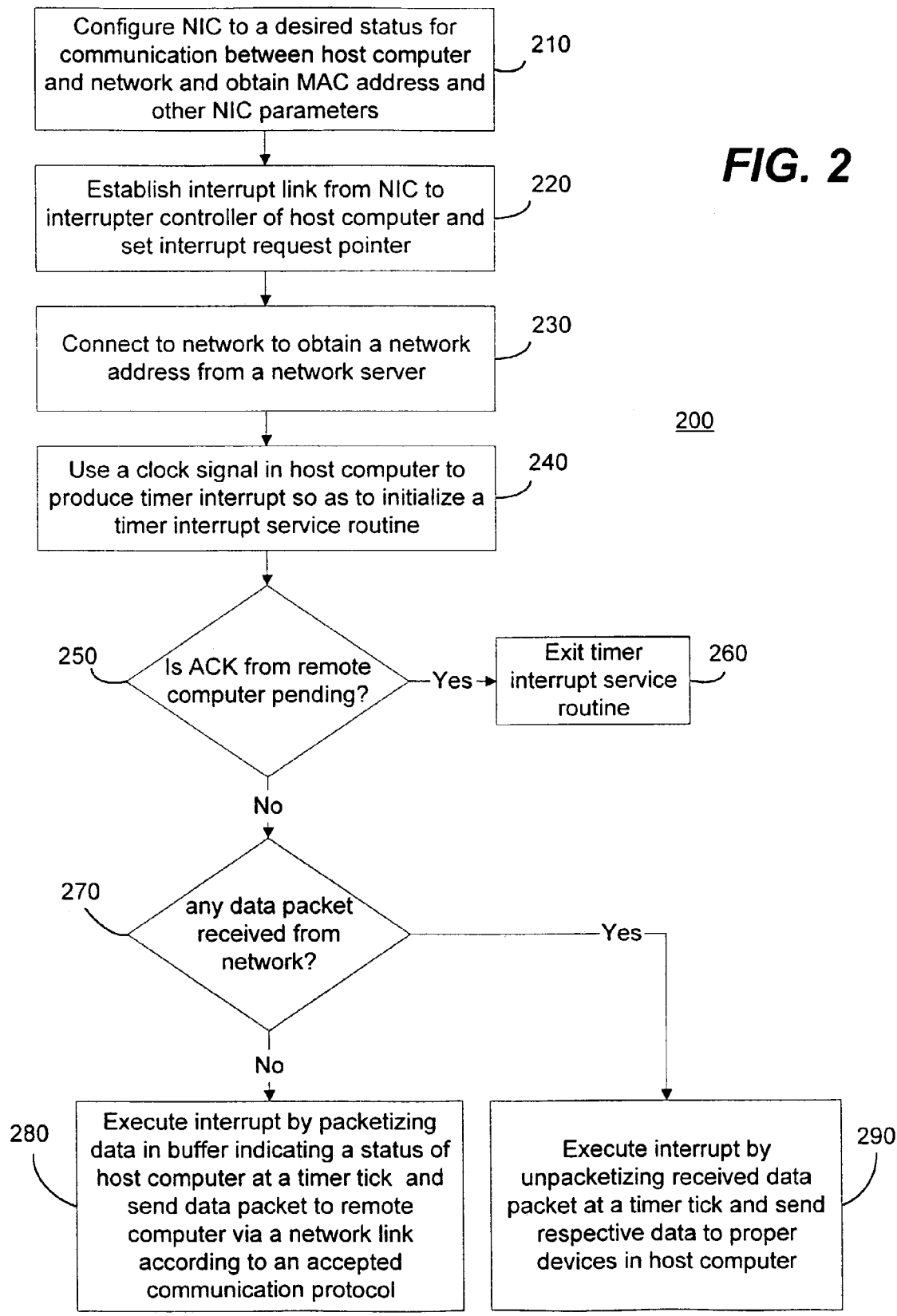
FIG. 2 is a flowchart of one embodiment of console redirection.

FIG. 2 shows a flowchart 200 that illustrates one embodiment of the console redirection. Steps 210 and 230 are initializing steps when the power to the NIC 116 is first turned on to obtain the information on the hardware configuration of the NIC 116 and to prepare the NIC 116 for communication with the network 120. At step 210, the parameters of NIC 116 and its MAC address are obtained and stored in the RAM 108 of the host computer 100. This may be done by using the NIC routines in the NIC ROM. Then the NIC 116 is connected to the interrupt controller 112 for executing the asynchronous ISR triggered by receiving of a data packet from the network 120 (step 220). Next, the communication between the NIC 116 and the network 120 is established by first requesting and obtaining a network address for the computer 100 from a server (step 230).

Computers 100 and 130 need to know each other's network addresses (e.g., IP addresses) in order to communicate. The address of the remote computer 130 may be stored in the ROM 108 in advance or communicated to the computer 100. The BIOS in the computer 100 may include the routines to inform the remote computer 130 of the network address for the computer 100 upon completion of the step 230. For example, the BIOS of the computer 100 may include an electronic mail routine (e.g., the Simple Mail Transfer Protocol for the Internet) to send the newly-assigned network address via email to the remote computer 130.

At step 240, a timer interrupt is issued at a timer tick when the BIOS controls the NIC 116 to send data to or receive data from the remote computer 130. The BIOS packetizes the data to send the first data packet to the remote computer 130. After sending the first data packet, the BIOS controls the NIC 116 to wait for an acknowledgment from the remote computer 130 for receiving a previous data packet sent by the computer 100 (step 250). When the acknowledgment is received by the NIC 116, the BIOS then determines whether a data packet intended for the computer 100 is received from the network 120. If no data is received, the BIOS opens a network link between the NIC 116 and the network 120 at a timer tick to packetize data from the BIOS and sends the data packet according to an accepted communication protocol, i.e., a timer ISR is executed (step 280). If data packet for the computer 100 is received, the BIOS first unpacketizes the received data packet at a timer tick and sends the respective data to intended devices in the computer 100 (step 290). The operation to send data to the network 120 is then executed in a later timer ISR.

The remote computer 130 may generate an acknowledgment signal each time it receives a data packet from the computer 100. Alternatively, the remote computer 130 may generate an acknowledgment signal after receiving two or more data packets from the computer 100. This latter method may be used to increase the speed and throughput of the communication between the computers 100 and 130. In particular, the remote computer 130 may adjust its frequency of acknowledgement based on the network conditions (e.g., data traffic). When the delay between computers 100 and 130 is relatively short, the computer 130 can send an acknowledgement signal to the computer 100 upon receiving one data packet therefrom. The computer 130 may reduce its frequency of acknowledgement when the delay increases, e.g., sending one acknowledgement signal to the computer 100 after every two or more data packets are received. The sliding window protocol is one example of such an adjustable acknowledgement mechanism.

If the acknowledgment for receiving a previously-sent data is pending (i.e., not received), the NIC 116 exits the timer ISR and waits to act upon the next timer interrupt. The NIC 116 resumes the timer ISR to execute steps 270, 280, or 290 to send data at a timer tick whenever the acknowledgment is received. In one aspect, the above BIOS routine of the computer 100 ensures that the computer 130 has the most current status of the computer 100 by executing any new command from the remote computer 130 or sending out any data only after the acknowledgement is received.

The remote computer 130 also uses the above acknowledgment-and-sending sequence to send data and commands to the computer 100. For example, the remote computer 130 receives console data such as display data from the computer 100 that indicates the current operating state. To control the computer 100 to perform a task, the remote computer 130 sends out data which may include a keystroke, a command, or a cursor action of a pointing device in the remote computer 130. The NIC 116 of the computer 100 receives and copies the data to the RAM 110. At a timer tick when a timer ISR is generated, the BIOS decodes the received data to determine its intended device in the computer 100 (e.g., processor 102 or a peripheral). The intended device then executes the command. The execution result is captured and stored in the buffer of the NIC 116 and the routine shown in FIG. 2 is performed to send the result to the remote computer 130. The remote computer 130 may then send another command to control the computer 100.

One implementation of the above console redirection technique of FIG. 2 uses instructions associated with the physical layer of the Preboot Execution Environment ("PXE") protocols. PXE instructions are stored in the NIC ROM as firmware to download an executable program from a server and to run the program locally in the client machine such as installing an operating system, booting the client, or the changing the configurations of the client. The PXE resides in the NIC ROM and includes a set of Universal Network Device Interface ("UNDI") instructions as the physical layer of network communication. This embodiment of console redirection uses this part of PXE as a physical layer driver for the NIC 116 to send data to the network 120 according to the User Datagram Protocol ("UDP").

Figure 3:
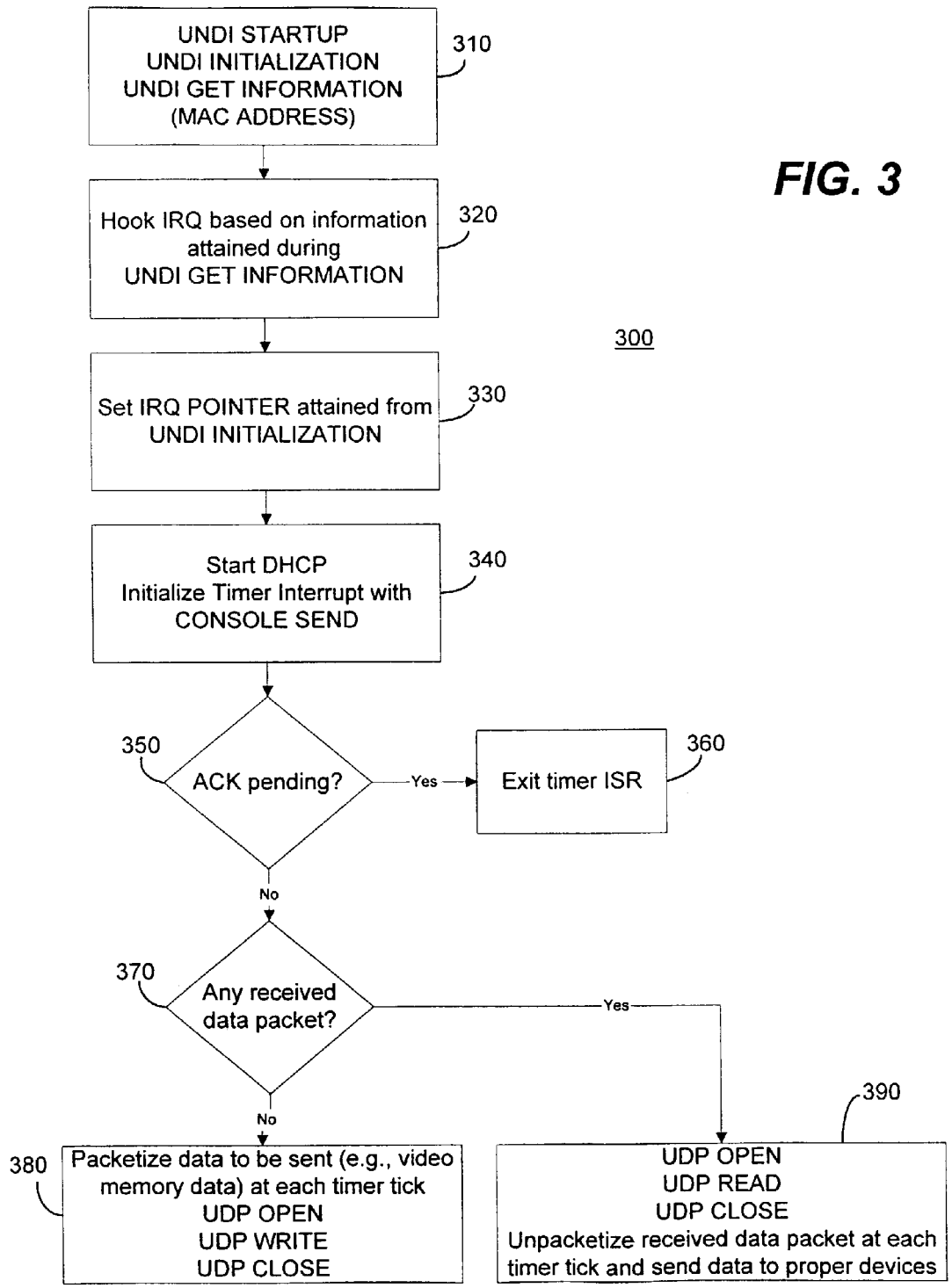
FIG. 3 is a flowchart for one implementation of console redirection based on the Preboot Execution Environment technology.

FIG. 3 shows the detailed implementation of console redirection based on PXE. At step 310, the PXE UNDI instruction "STARTUP" is executed to set up data structure and memory locations inside the BIOS of the computer 100. The UNDI instruction "INITIALIZATION" resets the NIC 116 into its default parameters. Then the UNDI instruction "GET INFORMATION" executes to copy the NIC variables including its MAC address into the RAM 110.

At steps 320 and 330, the interrupt controller 112 is linked to the NIC 116 to handle the asynchronous ISR generated by the NIC 116. This is done by using UNDI instruction "ISR" within the PXE. At step 320, the NIC 116 is connected to an available IRQ link to the interrupt controller 112 based on information of the NIC 116 obtained from "GET INFORMATION". Then the IRQ pointer is set to the address of the ISR retrieved from the ROM of the NIC 116.

The above operations prepare the hardware configurations of the NIC 116 for communication with the remote computer 130 through the network 120. Subsequent operations establish a communication link between the computers 100 and 130 and perform data transmission.

At step 340, the Dynamic Host Configuration Protocol ("DHCP") is used to get an IP address for the computer 100. First, the BIOS of the computer 100 broadcasts a DHCP request for an IP address and IP configuration parameters to DHCP servers in the network 120 through the NIC 116. One or more DHCP servers may respond to the request by sending their proposed IP addresses and configurations to the BIOS. The BIOS of the computer selects an IP address from a DHCP with desired configuration parameters. At this point, the computer 100 is ready to communicate with the remote computer 130.

Next, the BIOS of the computer 100 initializes a timer interrupt at a timer tick for sending data to the remote computer 130. First, the BIOS checks whether an acknowledgment from the remote computer 130 (step 350) is pending. If an acknowledgment is still pending at the next timer tick, the timer ISR is terminated and no data is sent until the acknowledgment is received (step 360).

If the acknowledgment from the remote computer 130 is received, a timer ISR is executed as follows. First, the BIOS determines whether is any received data in the RAM 110. If no new data is received, the BIOS packetizes the outgoing data in its RAM 110 and executes UDP OPEN to open a UDP connection to the network 120 at the next timer tick. Then, the BIOS uses UDP WRITE to write a data packet to the UDP connection which is sent to its intended receiver 130 over the network 120. Next, the UDP CLOSE is executed to terminate the link (step 380). If there's received data buffered in the RAM 110, BIOS executes UDP OPEN, UDP READ, and UDP CLOSE to retrieve the received data. The BIOS then unpacketizes the received data and send the data to one or more intended devices for execution (step 390).

One application of the above console redirection is to service and boot the computer 100 from the remote computer 130. Since data can be sent from the remote computer 130 to the computer 100, the computer 100 may boot by directly using the operating system stored in the remote computer 130 without downloading the operating system files. The execution routines of the operating system running in the remote computer 130 are sent to the computer 100 in form of data packets through the network 120. In another application, a user at the remote computer 130 may also use the resources in the computer 100 to run applications by simply redirecting the console of the computer 100 to the remote computer 130.

Furthermore, the console redirection may allow the remote computer 130 to performing certain operations in the computer 100 by remotely running one or more applications in the remote computer 130. For example, the remote computer 130 can diagnose software errors in the computer 100 and execute commands to fix the errors by running a diagnosis application in the remote computer 130. Alternatively, the remote computer 130 can send certain software components to update the application software installed in the computer 100 and hence to correct the errors.

Although only a few embodiments have been described, various modifications and enhancements may be made without departing from the scope of the following claims.

What is claimed is:

1. A method of controlling operations on a host computer using a control computer, comprising:
    receiving a plurality of received data packets from the control computer, the received data packets including information to control the at least one operation of at least one device on the host computer;
    transmitting a plurality of transmitted data packets from the host computer to the control computer, the transmitted data packets including information based on controlling one or more operations of the host computer; and
    processing the received data packets and the transmitted data packets, wherein the processing includes:
    initiating a first timer interrupt;
    initiating a second timer interrupt at a time interval after the first timer interrupt;
    determining whether a data packet has been received from the control computer during the time interval; and
    if a data packet has been received from the control computer during the time interval, unpacketizing the data packet, sending associated unpacketized data to one or more devices in the host computer, and controlling at least one operation of the one or more devices based on the unpacketized data.

2. The method of claim 1, further including determining a different time interval based on a data flow rate.

3. The method of claim 2, wherein the different time interval is determined to match a timer interrupt rate with the data flow rate.

4. The method of claim 1, further comprising packetizing data to transmit to the control computer if a data packet has not been received from the control computer during the time interval.

5. The method of claim 1, wherein the associated unpacketized data includes executable instructions for the intended device on the host computer.

6. The method of claim 5, further comprising:
determining the intended device; and
executing the executable instructions on the intended device.

7. The method of claim 6, wherein the intended device is chosen from the CPU of the host computer and a peripheral of the host computer.

8. The method of claim 6, further comprising producing an execution result based on executing the executable instructions.

9. The method of claim 8, further comprising packetizing the execution result and transmitting one or more packets including the execution result to the control computer.

10. The method of claim 1, wherein an operating system is running on the host computer during the controlling.

11. An article comprising a machine-readable medium storing instructions operable to cause one or more machines to perform operations comprising:
receiving a plurality of received data packets from the control computer, the received data packets including information to control the at least one operation of at least one device on the host computer,
transmitting a plurality of transmitted data packets from the host computer to the control computer, the transmitted data packets including information based on controlling one or more operations of the host computer; and
processing the received data packets and the transmitted data packets, wherein the processing includes:
initiating a first timer interrupt;
initiating a second timer interrupt at a time interval after the first timer interrupt;
determining whether a data packet has been received from the control computer during the time interval; and
if a data packet has been received from the control computer during the time interval, unpacketizing the data packet, sending associated unpacketized data to one or more devices in the host computer, and controlling at least one operation of the one or more devices based on the unpacketized data.

12. The article of claim 11, wherein the operations further include determining a different time interval based on a data flow rate.

13. The article of claim 12, wherein the different time interval is determined to match a timer interrupt rate with the data flow rate.

14. The article of claim 11, wherein the operations further include packetizing data to transmit to the control computer if a data packet has not been received from the control computer during the time interval.

15. The article of claim 11, wherein the associated unpacketized data includes executable instructions for an intended device on the host computer.

16. The article of claim 15, wherein the instructions further include:
determining the intended device; and
executing the executable instructions on the intended device.

17. The article of claim 16, wherein the operations further include producing an execution result based on executing the executable instructions.

18. The article of claim 17, further comprising packetizing the execution result and transmitting one or more packets including the execution result to the control computer.

19. The article of claim 15, wherein the intended device is chosen from the CPU of the host computer and a peripheral of the host computer.

20. The article of claim 11, wherein an operating system is running on the host computer during the controlling.

* * * * *